United States Patent [19]
Diekhans et al.

[11] Patent Number: 4,902,264
[45] Date of Patent: Feb. 20, 1990

[54] LOST-GRAIN DETECTOR FOR HARVESTING MACHINE

[75] Inventors: Norbert Diekhans, Gütersloh; Willi Behnke, Steinhagen, both of Fed. Rep. of Germany

[73] Assignee: Class oHG, Hersewinkel, Fed. Rep. of Germany

[21] Appl. No.: 244,486

[22] Filed: Sep. 14, 1988

[30] Foreign Application Priority Data

Sep. 16, 1987 [DE] Fed. Rep. of Germany ....... 3731080

[51] Int. Cl.⁴ .............................................. A01D 73/00
[52] U.S. Cl. .......................................... 460/5; 56/10.2
[58] Field of Search ...................... 56/10.2, DIG. 15; 130/27 R, 27 T; 460/5

[56] References Cited

U.S. PATENT DOCUMENTS

| | | | |
|---|---|---|---|
| 4,036,065 | 7/1977 | Strelioff et al. | 56/10.2 X |
| 4,230,130 | 10/1980 | Staiert | 130/27 R |
| 4,517,792 | 5/1985 | Denning et al. | 56/10.2 |
| 4,540,003 | 9/1985 | Osselaere | 130/27 T |

FOREIGN PATENT DOCUMENTS

| | | | |
|---|---|---|---|
| 0093991 | 11/1983 | European Pat. Off. | 56/10.2 |
| 0393988 | 12/1973 | U.S.S.R. | 56/10.2 |
| 0969196 | 10/1982 | U.S.S.R. | 56/10.2 |

Primary Examiner—William P. Neuder
Attorney, Agent, or Firm—Charles E. Baxley

[57] ABSTRACT

The grain-loss detector according to this invention usable in combination with a harvesting machine having an output passage comprises an impact plate having a front face exposed in the passage for direct contact by crop exiting the machine and an opposite back face and an electroacoustic transducer capable of converting vibration into an electrical output and having a side directly engaging the back face of the impact face. According to this invention the side of the transducer is retained in direct contact with the back face of the impact plate and electronic elements spaced from the transducer serve to convert the output of the transducer into a usable data signal.

11 Claims, 2 Drawing Sheets

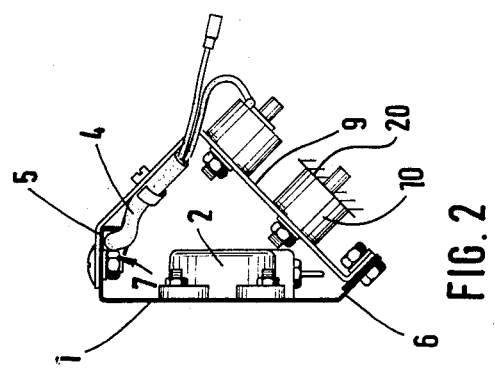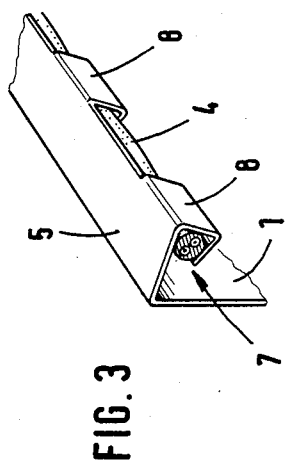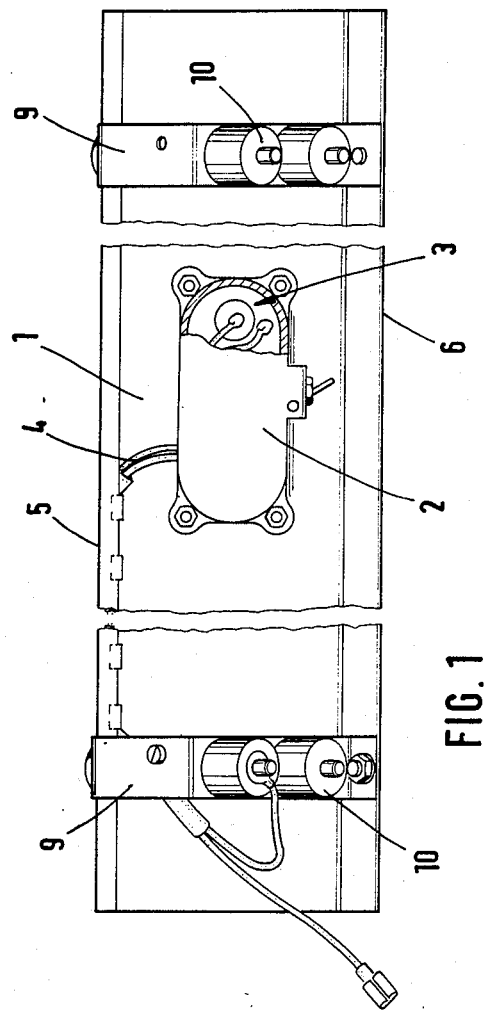

LOST-GRAIN DETECTOR FOR HARVESTING MACHINE

FIELD OF THE INVENTION

The present invention relates to a lost-grain detector for a harvesting machine. More particularly this invention concerns such a device used to measure the amount of grain in the hay output of such a machine.

BACKGROUND OF THE INVENTION

A standard lost-grain detector is constituted basically as a transducer which is associated with an impact plate placed along the path of the hay or straw exiting the harvester. This transducer emits electrical outputs when grain seeds strike the plate, as such are very hard as compared with the relatively soft hay, straw, or other stem crop normally passing over the impact plate. The electrical output of the transducer is analyzed and displayed, and also normally compared to a set point corresponding to a maximum loss level. This allows the harvester to be adjusted for maximum efficiency with minimal grain loss, as the harvester is not supposed to eject a significant amount of valuable grain with the stems of the crop.

Thus as described in German patent document 2,448,745 the impact plate is provided on its back face turned away from the outgoing stream of crop with a microphone constituting the transducer. This microphone comprises, as is standard, a casing having a front side that can constitute a diaphragm, and a mechanical/electrical transducing element between the back side of the casing and the diaphragm. In order to maximize the transmission of vibrations from the diaphragm to the transducing element, it is standard to mount a solid peg between the diaphragm of the microphone and the transducer element itself.

Thus a shock delivered by a seed to the impact plate must be transmitted through three interfaces to the diaphragm, that is first from the plate to the diaphragm, then from the diaphragm to the front end of the sound-transmitting peg, and finally from the sound-transmitting peg to the transducer itself. Each of these interfaces is typically a glue joint which has some elasticity and which can have different vibration-transmitting properties across a production run of such devices. The diaphragm/impact-plate interface is particularly subject to fouling by corrosion or dirt. Thus there will be considerable losses in this vibration-transmission path, and the response of one such grain-loss detector will vary substantially from that of another due to the differences in mechanical couplings at the three interfaces.

OBJECTS OF THE INVENTION

It is therefore an object of the present invention to provide an improved loss detector for a harvesting machine.

Another object is the provision of such an improved loss detector for a harvesting machine which overcomes the above-given disadvantages, that is which can accurately determine how many seeds hit the impact plate, and that also is constructed such that the response of such detectors will not vary substantially across a whole production line.

SUMMARY OF THE INVENTION

The grain-loss detector according to this invention usable in combination with a harvesting machine having an output passage comprises an impact plate having a front face exposed in the passage for direct contact by crop exiting the machine and an opposite back face and an electroacoustic transducer capable of converting vibration into an electrical output and having a side directly engaging the back face of the impact face. According to this invention the side of the transducer is retained in direct contact with the back face of the impact plate and electronic elements spaced from the transducer serve to convert the output of the transducer into a usable data signal.

Thus in the system of this invention there is a single interface between the transducer and the impact plate, one that in fact involves a direct connection, so that the transducer will produce an output that accurately represents the number of hard seeds that strike the impact plate. This is most easily achieved according to this invention when the transducer is a piezoelectric quartz crystal.

The transducer can be held by an adhesive to the impact plate or, when the side of the transducer and the impact plate are both metallic, the retaining means can be solder bonded to the plate and side. It is also within the scope of this invention to imbed the transducer in a potting mass adhering to the back face of the impact plate.

In accordance with another feature of this invention a casing secured to the back face of the impact plate surrounds the transducer and carries the electronic elements and a flexible electric wire connects the various circuit elements and the transducer. These electronic elements normally include a filter and a trigger stage.

The impact plate of this invention is rectangular, elongated, and has two long sides formed with bent-over flaps. The transducer and elements are mounted noncentrally toward one end of the plate so that the opposite end of the plate can be cut off to fit the plate to harvesters of different size and one of the flaps is formed with bent-over tabs. Cabling extends from the elements and is secured under the tabs. Mounting struts support the impact plate in the passage and extend only between the flaps. These mounting struts are provided with resilient shock mounts by means of which the detector is mounted on the harvester.

DESCRIPTION OF THE DRAWING

The above and other objects, features, and advantages will become more readily apparent from the following, reference being made to the accompanying drawing in which:

FIG. 1 is a view from the back of the detector according to the invention;

FIG. 2 is a side view of the detector;

FIG. 3 is a large-scale perspective view of a detail of the detector;

SPECIFIC DESCRIPTION

As seen in FIGS. 1 through 3 the detector of this invention is carried on a metallic and rectangularly elongated sensor or impact plate 1 having as seen in FIG. 2 a left-facing front face and a right-facing back face. In use this plate 1 is mounted in the underside of the output passage of the harvesting machine so that the outgoing crop passes over it. The function of the detector is to record the impacts created as seeds or grain hit this plate.

Figure 4:
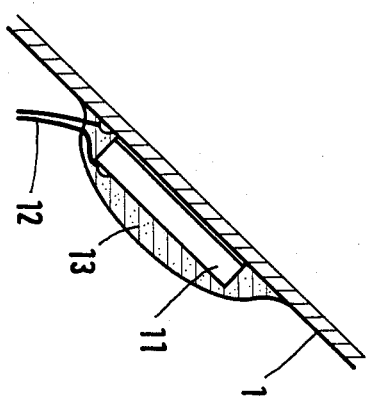
FIG. 4 is a section through a portion of the detector.

The back face of the plate 1 carries a cup-shaped casing 2 which is open toward the plate 1 and in which is provided an electroacoustic transducer 3 which itself is as seen in FIG. 4 is constituted by a piezoelectric element 11 affixed directly to the rear face of the plate 1. The transducer 3 is connected by a wire 4 to control circuitry described in greater detail below with reference to FIG. 5.

As best seen in FIG. 2 the horizontal long edges of the plate 1 are bent over as lips 5 and 6 with one or more folds so as to stiffen the plate 1. In addition the transducer is mounted noncentrally in the plate 1 so that it can be cut to length to fit the detector into different pieces of harvesting equipment. The sound transmission is so good in the stiffenen plate that the transducer 3 need not be located dead center to detect impacts at the ends of the plate 1. If shortening the plate 1 leaves the transducer 3 off center, this does not matter.

As particularly seen in FIG. 3 the bent-over lip 5 is formed with multiply bent tabs 8 that form a cable clip or passage 7 in which the cable 4 is held. Furthermore as seen in FIG. 2 the lips 5 are the mounting places for V-shaped struts 9 having upper ends bolted to the upper lip 5 and lower ends bolted to the lower lip 6. These struts 9 carry shock mounts 10 of standard configuration, that is a short cylinder of an elastomer vulcanized at its end faces to plates carrying threaded studs. One stud is bolted through the strut and the other through a part of the frame of the harvester as indicated schematically at 20.

FIG. 4 shows in detail how the piezoelectric quartz crystal 11 of the transducer 3 is secured directly by potting 13 to the back face of the plate 1, with the two leads 12 for the crystal 11 leading out of the potting. The potting 13 could be replaced by a solder joint if the crystal 11 has a solderable metal housing.

Figure 5:
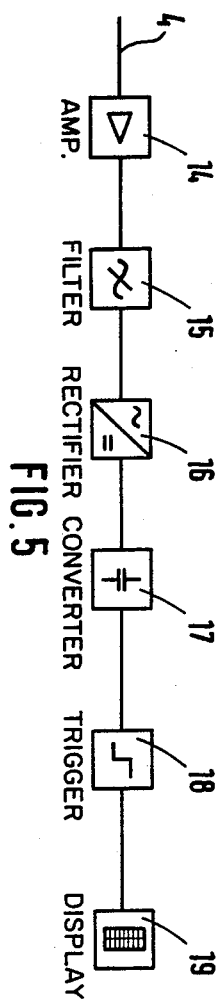
FIG. 5 is a schematic diagram of the electronics of the system of this invention.

FIG. 5 illustrates the circuitry fed by the transducer 3. It comprises a standard analog amplifier 14 followed by a filter 15 set to eliminate incoming signals of a frequency, amplitude, and so on as not likely to be created by a crop seed or grain striking the front face of the plate 1. The filter output is fed to a rectifier and thence to a unit 17 which forms the effective or rms value of the voltage signal. The signal is then processed by a threshold detector or trigger stage 18 and is fed to a display 19. The display 19 shows the amount of crop lost and can be used by the driver or by a machine-control system to vary operation of the harvester, for instance slowing it down to reduce crop loss or speed up when crop loss is very low.

We claim:

1. In combination with a harvesting machine having an output passage, a grain-loss detector comprising:
   an impact plate having a front face exposed in the passage for direct contact with crop exiting the machine and an opposite back face;
   an electroacoustic piezoelectric quartz crystal transducer capable of converting vibration into an electrical output and having a side directly engaging the back face of the impact plate;
   means retaining the side of the transducer in direct contact with the back face of the impact plate; and
   means including electronic elements spaced from the transducer for converting the output of the transducer into a usable data signal.

2. The grain-loss detector defined in claim 1 wherein the retaining means is an adhesive.

3. The grain-loss detector defined in claim 1 wherein the side of the transducer and the impact plate are both metallic, the retaining means being solder bonded to the plate and side.

4. The grain-loss detector defined in claim 1 wherein the retaining means is a potting mass surrounding the transducer and adhering to the back face of the impact plate.

5. The grain-loss detector defined in claim 1, further comprising:
   a casing secured to the back face of the impact plate, surrounding the transducer, and carrying the electronic elements; and
   a flexible electric wire connected between the elements and the transducer.

6. The grain-loss detector defined in claim 1 wherein the impact plate is rectangular, elongated, and has two long sides formed with bent-over flaps.

7. The grain-loss detector defined in claim 6 wherein the transducer and elements are mounted noncentrally toward one end of the plate, whereby the opposite end of the plate can be cut off to fit the plate to harvesters of different size.

8. In combination with a harvesting machine having an output passage, a grain-loss detector comprising:
   an impact plate having a front face exposed in the passage for direct contact by crop exiting the machine and an opposite back face;
   an electroacoustic transducer capable of converting vibration into an electrical output and having a side directly engaging the back face of the impact plate;
   means retaining the side of the transducer in direct contact with the back face of the impact plates;
   means including electronic elements spaced from the transducer for converting the output of the transducer into a usable data signal;
   one of the flaps formed with bent-over tabs;
   cabling extending from the elements and secured under the tabs.

9. In combination with a harvesting machine having an output passage, a grain-loss detector comprising:
   an impact plate having a front face exposed in the passage for direct contact by crop exiting the machine and an opposite back face;
   an electroacoustic transducer capable of converting vibration into an electrical output and having a side directly engaging the back face of the impact plate;
   means retaining the side of the transducer in direct contact with the back face of the impact plate;
   means including electronic elements spaced from the transducer for converting the output of the transducer into a usable data signal;
   mounting struts for supporting the impact plate in the passage and extending only between the flaps.

10. The grain-loss detector defined in claim 9 wherein the mounting struts are provided with resilient shock mounts by means of which the detector is mounted on the harvester.

11. The grain-loss detector defined in claim 1 wherein the electronic elements include a filter and a trigger stage.

* * * * *